US012679072B2

(12) United States Patent
Ikegami et al.

(10) Patent No.: US 12,679,072 B2
(45) Date of Patent: Jul. 14, 2026

(54) VEHICLE WINDOW GLASS AND MANUFACTURING METHOD THEREFOR, VEHICLE LAMINATED GLASS, AND VEHICLE WINDSHIELD

(71) Applicant: AGC Inc., Tokyo (JP)

(72) Inventors: Ayaka Ikegami, Tokyo (JP); Yuukou Minamiya, Tokyo (JP); Shunsuke Sadakane, Tokyo (JP); Hiroki Fujimoto, Tokyo (JP); Jun Ito, Tokyo (JP); Keiichiro Uraji, Tokyo (JP)

(73) Assignee: AGC INC., Tokyo (JP)

( * ) Notice: Subject to any disclaimer, the term of this patent is extended or adjusted under 35 U.S.C. 154(b) by 312 days.

(21) Appl. No.: 18/627,756

(22) Filed: Apr. 5, 2024

(65) Prior Publication Data

US 2024/0246321 A1 Jul. 25, 2024

Related U.S. Application Data

(63) Continuation of application No. PCT/JP2022/037020, filed on Oct. 3, 2022.

(30) Foreign Application Priority Data

Oct. 6, 2021 (JP) ................................. 2021-165064

(51) Int. Cl.
*B32B 17/10* (2006.01)
*B60K 35/23* (2024.01)

(52) U.S. Cl.
CPC .... *B32B 17/10339* (2013.01); *B32B 17/1099* (2013.01); *B60K 35/23* (2024.01)

(58) Field of Classification Search
CPC .......... B32B 17/10339; B32B 17/1099; C03C 27/10
See application file for complete search history.

(56) References Cited

U.S. PATENT DOCUMENTS 10,773,496 B2 * 9/2020 Aoki ................. B32B 17/10036
11,897,810 B2 * 2/2024 Oya .................. B32B 17/10036
(Continued)

FOREIGN PATENT DOCUMENTS

JP H11-157873 A 6/1999
JP 2008-266056 A 11/2008
(Continued)

OTHER PUBLICATIONS

International Searching Authority, "International Search Report," issued in connection with International Patent Application No. PCT/JP2022/037020, dated Dec. 13, 2022.
(Continued)

*Primary Examiner* — Huan Le
(74) *Attorney, Agent, or Firm* — Foley & Lardner LLP

(57) ABSTRACT

A window glass for a vehicle includes: a glass plate having a first main surface and a second main surface; a ceramic color layer; and an organic ink layer, in which the glass plate has a curved surface shape in which the first main surface is concave, and has an information transmission and reception region, the ceramic color layer is provided in a peripheral portion of the region on the first main surface, the organic ink layer is provided to cover a partial region on the first main surface and at least a partial region on the ceramic color layer, as well as a boundary portion between the glass plate and the ceramic color layer on the first main surface, and a thickness of the organic ink layer is smaller than a thickness of the ceramic color layer.

14 Claims, 5 Drawing Sheets

(56) References Cited

U.S. PATENT DOCUMENTS

| | | |
|---|---|---|
| 2010/0098917 A1 | 4/2010 | Lyon |
| 2018/0257342 A1* | 9/2018 | Yano ................. B32B 17/10036 |
| 2020/0171800 A1 | 6/2020 | Cleary et al. |
| 2020/0391577 A1 | 12/2020 | Gard et al. |
| 2022/0176679 A1 | 6/2022 | Cleary et al. |

FOREIGN PATENT DOCUMENTS

| | | |
|---|---|---|
| JP | 2010-506793 A | 3/2010 |
| JP | 2020-519509 A | 7/2020 |
| JP | 2021-511275 A | 5/2021 |
| WO | WO-2015/186839 A1 | 12/2015 |

OTHER PUBLICATIONS

International Searching Authority, "Written Opinion," issued in connection with International Patent Application No. PCT/JP2022/037020, dated Dec. 13, 2022.

* cited by examiner

VEHICLE WINDOW GLASS AND MANUFACTURING METHOD THEREFOR, VEHICLE LAMINATED GLASS, AND VEHICLE WINDSHIELD

CROSS-REFERENCE TO RELATED APPLICATIONS

This is a bypass continuation of International Patent Application No. PCT/JP2022/037020, filed on Oct. 3, 2022, which claims priority to Japanese Patent Application No. 2021-165064, filed on Oct. 6, 2021. The contents of these applications are hereby incorporated by reference in their entireties.

TECHNICAL FIELD

The present invention relates to a window glass for a vehicle and a manufacturing method therefor, and also relates to a laminated glass for a vehicle and a windshield for a vehicle.

BACKGROUND ART

In a window glass for a vehicle such as an automobile, a ceramic color layer, which is a colored opaque layer, is sometimes formed in a periphery of the glass plate or in a peripheral portion of a region through which a signal transmitted and received by an information communication device passes.

Examples of the information communication device include a camera, a radar, a rain sensor, a light sensor, and an in-vehicle communication device.

The camera receives light in a visible light region and an infrared region from outside a vehicle to capture images of the outside of the vehicle.

The radar is a type of sensor that measures a distance to an object outside the vehicle by emitting laser light or radio waves and measuring a time it takes for the laser light or the radio waves to reflect back from the object. Examples thereof include a laser radar and a millimeter wave radar, and the laser radar is sometimes referred to as a lidar (LiDAR: laser imaging detection and ranging).

The rain sensor detects an amount of water droplets adhering to a window glass for a vehicle and is used to automatically start and stop wipers. The light sensor detects brightness outside the vehicle and is used to automatically turn on and off a light that illuminates the outside of the vehicle.

The in-vehicle communication device performs two-way communication with an infrastructure device installed on roads to obtain road traffic information, which is used for driving a vehicle.

When the window glass for a vehicle for such as an automobile is provided with a ceramic color layer in the periphery of the glass plate, adhesives such as a urethane sealant that bond and hold the glass plate and an automobile body can be prevented from deteriorating due to ultraviolet rays. In addition, the ceramic color layer also plays the role of concealing a portion where the adhesive sticks out, a conductive layer such as an antenna or a heating wire formed in the periphery of the glass plate, or mounted parts such as a mirror base and a bracket that are bonded to the glass plate to prevent the same to be visually recognized from outside the vehicle. Further, for the purpose of improving the design, it may be a ceramic color layer in which, for example, a fine dot pattern is formed in a gradation manner.

A ceramic color composition, which is a precursor of the ceramic color layer, is known to be based on a glass powder and mixed with various heat-resistant pigments. The glass powder may be based on an amorphous glass powder that does not crystallize during glass baking, or a crystalline glass powder that crystallizes during glass baking.

For example, Patent Literature 1 discloses a ceramic color composition containing 50 wt % to 90 wt % of a zinc-containing low-melting glass powder having a specific composition that does not contain harmful metals such as lead, 10 wt % to 40 wt % of an inorganic pigment powder, and 0 wt % to 10 wt % of an inorganic filler powder.

In addition, Patent Literature 2 discloses a ceramic color composition containing a lead-free glass powder containing $Bi_2O_3$ and $SiO_2$ as main components, 0.05 wt % to 9.95 wt % of MgO, and 0.05 wt % to 9.95 wt % of BaO, in which a total content of MgO and BaO is 0.1 wt % to 10 wt %.

CITATION LIST

Patent Literature

Patent Literature 1: JPH11-157873A
Patent Literature 2: JP2008-266056A
Patent Literature 3: JP2021-511275A

SUMMARY OF INVENTION

The ceramic color layer is formed by applying the ceramic color composition onto a main surface of the glass plate by using a screen printing method, followed by a heat treatment and firing. When the heat treatment is performed at a temperature equal to or higher than an annealing point of the glass, the glass plate can be bent and molded at the same time if desired.

When a heat treatment is performed at a high temperature enough to bend and mold the glass plate in the formation of the ceramic color layer, a deviation occurs in degree of expansion and contraction due to a difference in thermal expansion coefficient between a region where the ceramic color layer is formed and a region where the ceramic color layer is not formed in the glass plate. That is, a distortion occurs in the glass plate around a boundary portion between the region where the ceramic color layer is formed and the region where the ceramic color layer is not formed.

When a signal transmitted and received by the information communication device passes through a portion where the above distortion occurs, the signal is not transmitted accurately. For example, when the information communication device is a camera, it causes the image to be distorted, and when it is a laser radar or a millimeter wave radar, it causes an optical axis to be deviated.

However, when the ceramic color layer is formed at a temperature lower than the annealing point of the glass after bending and molding the glass plate in order to prevent the occurrence of the above distortion, the firing of the ceramic color composition is insufficient. As a result, color development of the ceramic color layer is poor and the ceramic color layer is likely to peel off from the glass plate.

With respect to this, for example, Patent Literature 3 discloses that a dark organic ink is applied by using a screen printing method to conceal a region where the distortion occurs. However, when the dark organic ink is applied by using the screen printing method, thicknesses of a dark organic ink layer and the ceramic color layer are approximately the same. When the thicknesses of the dark organic ink layer and the ceramic color layer are approximately the same, it is difficult to distinguish a boundary between the ceramic color layer and the dark organic ink layer. When it is difficult to distinguish the boundary between the ceramic color layer and the dark organic ink layer, it is difficult to determine whether the dark organic ink layer is formed on a desired region on the glass plate.

Therefore, an object of the present invention is to provide a window glass for a vehicle formed with an organic ink layer and a ceramic color layer, in which a boundary between the organic ink layer and the ceramic color layer can be easily distinguished and in which a signal transmitted and received by an information communication device can be transmitted without being hindered, and a manufacturing method therefor.

As a result of intensive studies, the inventors of the present invention have found that the above problems can be solved by forming an organic ink layer on a region of a glass plate that includes a portion where distortion occurs during formation of a ceramic color layer. Thus, the present invention has been completed.

That is, the present invention relates to the following [1] to [14].

[1] A window glass for a vehicle including: a glass plate having a first main surface and a second main surface; a ceramic color layer; and an organic ink layer, in which the glass plate has a curved surface shape in which the first main surface is concave, and has an information transmission and reception region through which a signal transmitted and received by an information communication device disposed on a first main surface side passes, the ceramic color layer is provided in a peripheral portion of the information transmission and reception region on the first main surface of the glass plate, the organic ink layer is provided to cover a partial region on the first main surface of the glass plate and at least a partial region on the ceramic color layer, as well as a boundary portion between the glass plate and the ceramic color layer on the first main surface of the glass plate, and a thickness of the organic ink layer is smaller than a thickness of the ceramic color layer.

[2] The window glass for a vehicle according to the above [1], in which the ceramic color layer has a surface roughness Ra of 0.25 µm or more.

[3] The window glass for a vehicle according to the above [1], in which the thickness of the ceramic color layer is 6 µm to 30 µm, and the thickness of the organic ink layer is 1 µm to 10 µm.

[4] The window glass for a vehicle according to the above [1], in which the information transmission and reception region on the first main surface of the glass plate is an independent region separated by the organic ink layer.

[5] The window glass for a vehicle according to the above [1], in which the information transmission and reception region on the first main surface of the glass plate is continuous with another region on the glass plate without being separated by the organic ink layer.

[6] The window glass for a vehicle according to the above [1], in which the window glass is configured to be disposed in a vehicle such that the first main surface of the glass plate is on a vehicle inner side and the second main surface of the glass plate is on a vehicle outer side.

[7] A laminated glass for a vehicle including: the window glass for a vehicle according to any one of the above [1] to [6].

[8] A windshield for a vehicle including: the window glass for a vehicle according to any one of the above [1] to [6].

[9] A windshield for a vehicle including: the laminated glass for a vehicle according to the above [7].

[10] A method for manufacturing a window glass for a vehicle, sequentially including: preparing a glass plate having a first main surface and a second main surface; applying a pasty ceramic color composition to a peripheral portion of an information transmission and reception region, through which a signal transmitted and received by an information communication device disposed on a first main surface side passes, on the first main surface of the glass plate, and performing a heat treatment at a firing temperature equal to or higher than an annealing point of the glass plate to bend and mold the glass plate such that the first main surface is concave and form a ceramic color layer; and applying an organic ink composition to cover a partial region on the first main surface of the glass plate and at least a partial region on the ceramic color layer, as well as a boundary portion between the glass plate and the ceramic color layer, and curing the organic ink composition to form an organic ink layer, in which the organic ink composition is applied such that a thickness of the organic ink layer is smaller than a thickness of the ceramic color layer.

[11] The method for manufacturing a window glass for a vehicle according to the above [10], in which the organic ink composition is applied by an inkjet printing.

[12] The method for manufacturing a window glass for a vehicle according to the above or [11], in which the annealing point of the glass plate is 500° C. to 600° C.

[13] The method for manufacturing a window glass for a vehicle according to the above or [11], in which the organic ink layer is formed by thermal curing or photocuring of the organic ink composition.

[14] The method for manufacturing a window glass for a vehicle according to the above or [11], in which the organic ink layer is formed by thermal curing of the organic ink composition, and the thermal curing is performed at a heat treatment temperature lower than the firing temperature equal to or higher than the annealing point of the glass plate.

According to the present invention, the organic ink layer is formed on a region of the glass plate that includes a portion where distortion occurs during formation of the ceramic color layer. Therefore, there is no distortion in an information transmission region of the glass plate through which a signal transmitted and received by the information communication device passes, and the signal is transmitted accurately without being hindered. That is, when the information communication device is a camera, image distortion can be prevented, and when the information communication device is a laser radar, a deviation of an optical axis can be prevented.

In addition, since the organic ink layer is effective even if the thickness thereof is small, there is no need to perform recoating. Therefore, the thickness of the organic ink layer can be made smaller than the thickness of the ceramic color layer, the boundary between the organic ink layer and the ceramic color layer can be easily distinguished, and it can be easily determined whether the organic ink layer is formed on a desired region on the glass plate.

DESCRIPTION OF EMBODIMENTS

Hereinafter, the present invention will be described in detail, but the present invention is not limited to the following embodiment and can be freely modified and implemented without departing from the gist of the present invention. In addition, the symbol "-" or the word "to" that is used to express a numerical range includes the numerical values before and after the symbol or the word as the upper limit and the lower limit of the range, respectively.

<Window Glass for a Vehicle>

Figure 1:
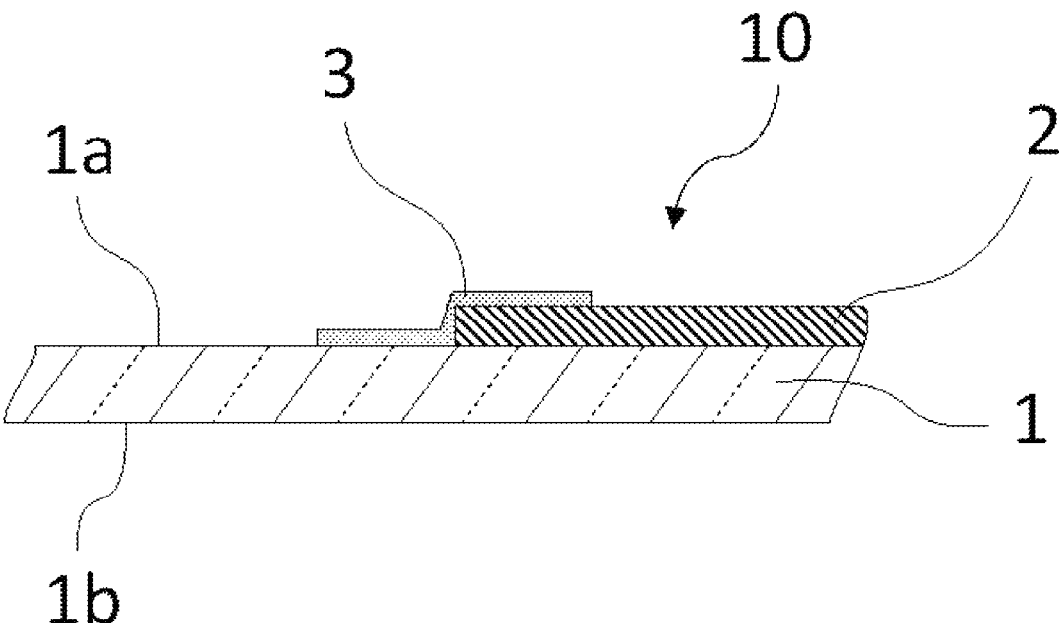
FIG. 1 is a schematic cross-sectional view showing an example of a part of a window glass for a vehicle according to the present embodiment.
Figure 2:
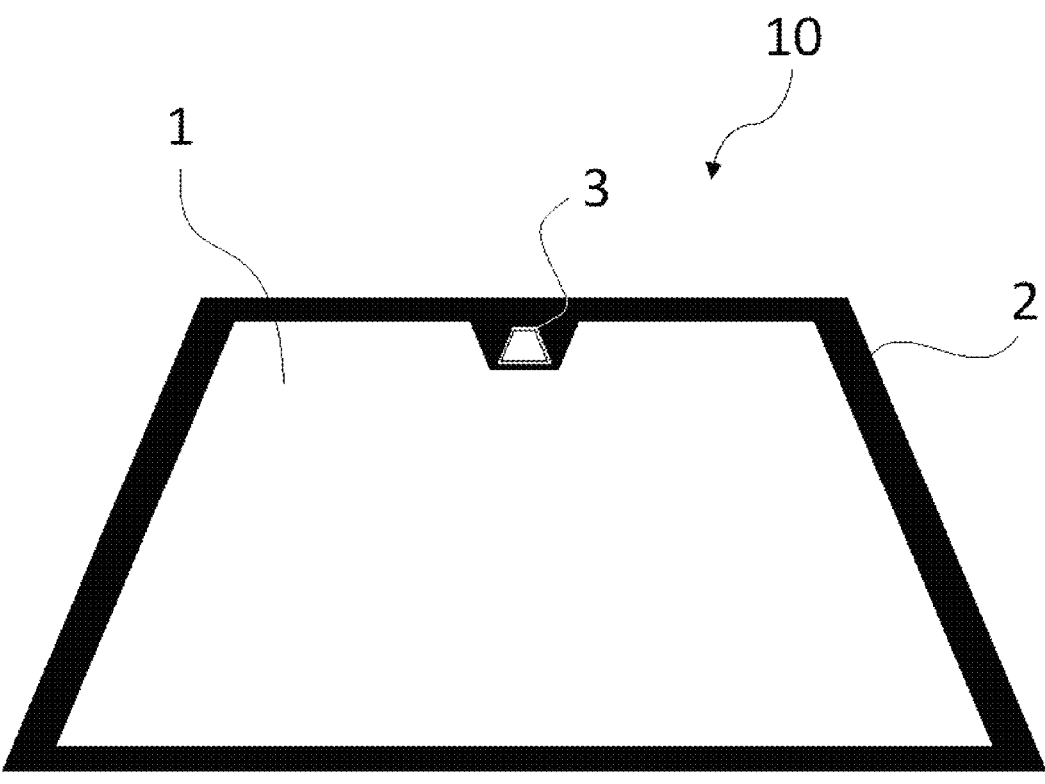
FIG. 2 is a schematic diagram showing an example of the window glass for a vehicle according to the present embodiment.

As shown in FIG. 1, in a window glass 10 for a vehicle according to the present embodiment, a glass plate 1 has a first main surface 1a and a second main surface 1b, and has a curved surface shape (not shown) in which the first main surface 1a is concave. The glass plate 1 has an information transmission and reception region through which a signal transmitted and received by an information communication device disposed on a first main surface 1a side passes. For example, in FIG. 2 and FIG. 3, a region surrounded by an organic ink layer 3 is the information transmission and reception region. Note that, in FIG. 3, a region in which three sides are surrounded by the organic ink layer 3 is the information transmission and reception region. In this way, all sides of the information transmission and reception region does not necessarily need to be surrounded by the organic ink layer 3 so that the information transmission and reception region is independent.

A ceramic color layer 2 is provided at least in a peripheral portion of the information transmission and reception region on the first main surface 1a of the glass plate 1. The organic ink layer 3 is provided to cover a partial region on the first main surface 1a of the glass plate 1 and at least a partial region on the ceramic color layer 2, including a boundary portion between the glass plate 1 and the ceramic color layer 2 on the first main surface 1a of the glass plate 1.

A thickness of the organic ink layer 3 is smaller than a thickness of the ceramic color layer 2.

The ceramic color layer absorbs light in an infrared region. Therefore, when a heat treatment to form the ceramic color layer is performed at a high temperature enough to bend and mold a glass plate, a deviation occurs in degree of expansion and contraction of the glass plate between a region where the ceramic color layer is formed and a region where the ceramic color layer is not formed of the glass plate. Due to this, an uneven shape is formed on the glass plate at a boundary between the region where the ceramic color layer is formed and the region where the ceramic color layer is not formed. Due to the uneven shape of the glass plate, a distortion occurs in the glass plate around a boundary portion between the region where the ceramic color layer is formed and the region where the ceramic color layer is not formed.

When a signal transmitted and received by the information communication device passes through a portion where the distortion occurs, the signal is not transmitted accurately. For example, when the information communication device is a camera, it causes the image to be distorted, and when it is a laser radar, it causes an optical axis to be deviated.

As described above, when the information transmission and reception region is formed on the glass plate surrounded by only the ceramic color layer, a distortion occurs in a portion of the glass plate near the ceramic color layer. However, by providing an organic ink layer to cover the portion where the distortion occurs, when the signal transmitted and received by the information communication device passes through the information transmission and reception region of the glass plate, the signal is transmitted accurately without being hindered. In other words, by forming the information transmission and reception region on the glass plate with the organic ink layer, the signal transmitted and received by the information communication device is transmitted accurately.

(Organic Ink Layer)

The organic ink layer is provided at least in a periphery of the information transmission and reception region on the first main surface of the glass plate. That is, the organic ink layer is provided to cover a partial region on the first main surface of the glass plate and at least a partial region on the ceramic color layer, including a boundary portion between the glass plate and the ceramic color layer, which is to be a peripheral portion of the information transmission and reception region.

However, this does not in any way exclude that the organic ink layer is provided in a region other than the peripheral portion of the information transmission and reception region. For example, the organic ink layer may also be provided in a periphery of the window glass for a vehicle.

The organic ink layer is formed by applying an organic ink composition, which is a precursor of the organic ink layer, to a desired region on the first main surface of the glass plate or the surface of the ceramic color layer by printing or the like, and then curing the organic ink composition. Note that, the organic ink composition is a composition containing a coloring material that is an organic coloring agent such as an organic pigment or an organic dye.

By providing the organic ink layer in a region including the above boundary portion, the information transmission and reception region is formed on the first main surface of the glass plate. The organic ink layer may be provided to cover the above distortion occurring in the glass plate, and may cover at least a partial region or the entire region on the ceramic color layer.

A width of the organic ink layer covering the ceramic color layer, that is, a width at which the organic ink layer and the ceramic color layer overlap each other, is preferably 1 mm to 6 mm, more preferably 2 mm to 5.5 mm, and still more preferably 2 mm to 5 mm. Here, from the viewpoint of productivity of the organic ink layer, the above overlapping width is preferably 1 mm or more, and more preferably 2 mm or more. In addition, a resin or metal bracket for attaching the information communication device is attached to the ceramic color layer via an adhesive such as urethane or a double-sided tape. From the viewpoint of applying the adhesive and attaching the double-sided tape, it is preferable that there be a region on the ceramic color layer that is not covered with the organic ink layer. Therefore, the overlapping width is preferably 6 mm or less, more preferably 5.5 mm or less, and still more preferably 5 mm or less. Note that, the width of the organic ink layer covering the ceramic color layer may not be constant.

A width of the organic ink layer directly covering the first main surface of the glass plate without the ceramic color layer is preferably 4 mm to 20 mm, more preferably 6 mm to 18 mm, and still more preferably 10 mm to 16 mm. Here, from the viewpoint of covering a distorted region on the glass plate, the above width is preferably 4 mm or more, more preferably 6 mm or more, and still more preferably 10 mm or more. In addition, from the viewpoint of ensuring the information transmission and reception region, the above width is preferably 20 mm or less, more preferably 18 mm or less, and still more preferably 16 mm or less. Note that, the width of the organic ink layer directly covering the first main surface of the glass plate may not be constant.

A thickness of the organic ink layer is preferably 1 $\mu$m to 30 $\mu$m, more preferably 1 $\mu$m to 20 $\mu$m, still more preferably 1 $\mu$m to 15 $\mu$m, and particularly preferably 1 $\mu$m to 10 $\mu$m. Here, when the thickness of the organic ink layer is made smaller than a thickness of the ceramic color layer, a boundary between the organic ink layer and the ceramic color layer can be easily distinguished. From such a viewpoint, the thickness of the organic ink layer is preferably 30 $\mu$m or less, more preferably 20 $\mu$m or less, still more preferably 15 $\mu$m or less, and particularly preferably 10 $\mu$m or less. In addition, from the viewpoint of preventing defects such as holes, the thickness of the organic ink layer is preferably 1 $\mu$m or more.

In addition, a difference between the thickness of the organic ink layer and the thickness of the ceramic color layer is preferably 1 $\mu$m or more, more preferably 3 $\mu$m or more, and still more preferably 5 $\mu$m or more. There is no upper limit to the difference in thickness, and it is, for example, 20 $\mu$m or less.

The thickness of the organic ink layer is obtained by stylus measurement using a surface roughness measuring device in accordance with JIS B 0601 (1994). Note that, the thickness of the organic ink layer is not the thickness after application of the organic ink composition, which is a precursor of the organic ink layer, but the thickness of the organic ink layer after the organic ink composition is cured.

The thickness of the organic ink layer does not need to be constant. It is preferable that the thickness of the organic ink layer at a position 2 mm away from the boundary portion between the glass plate and the ceramic color layer in a direction in which only the organic ink layer is formed be within the above range.

The organic ink layer at the boundary portion between the ceramic color layer and the glass plate is preferably thinner than the organic ink layer at another region. When the organic ink layer at the boundary portion between the ceramic color layer and the glass plate is thinner than the organic ink layer at another region, the boundary between the ceramic color layer and the organic ink layer can be easily distinguished, and it can be determined whether the organic ink layer is formed in a desired region on the glass plate.

The organic ink layer may be formed to have 100% halftone dots, that is, to cover the first main surface of the glass plate or the ceramic color layer without any gaps, which is called solid coating, or may have more than 0% and less than 100% halftone dots. The halftone dots can blur the boundary portion between the glass plate and the organic ink layer and the boundary portion between the organic ink layer and the ceramic color layer on an organic ink and the first main surface of the glass plate. This is effective when the appearance of the boundary portion cannot be said to be good due to a color difference between the glass plate and the organic ink layer or a color difference between the organic ink layer and the ceramic color layer.

The shape of the halftone dots can be any shape, such as a circle, an ellipse, a square, a rhombus, a diamond shape, a pincushion shape, a hexagon, or a T-shape.

Figure 3:
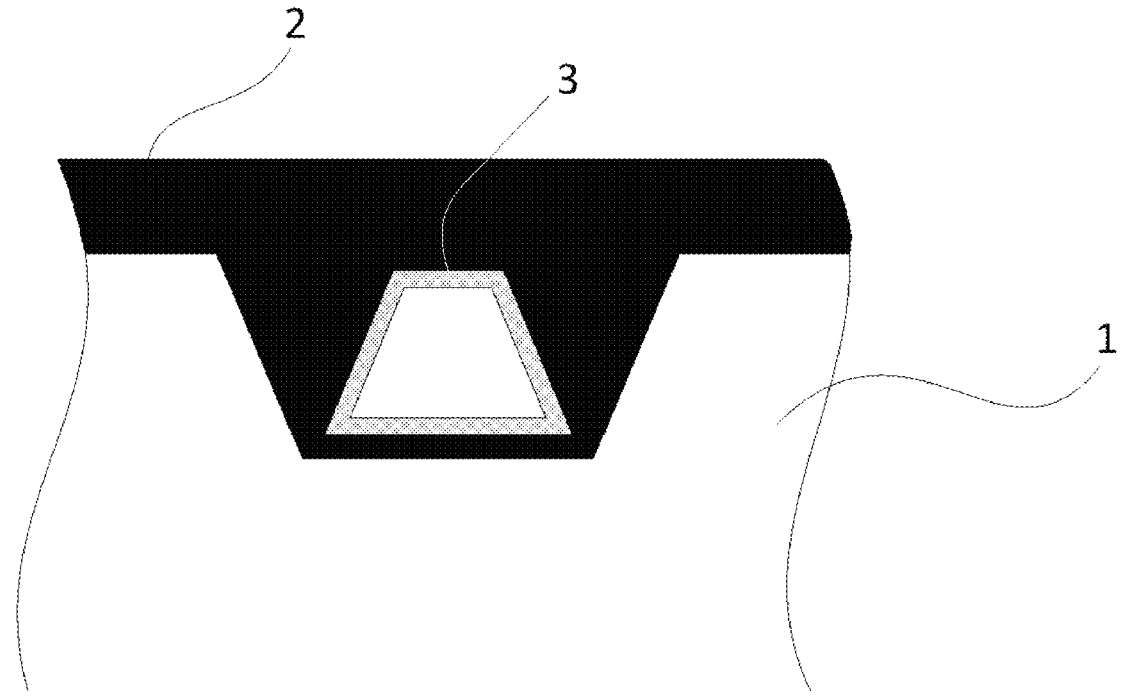
FIG. 3 is a schematic diagram showing an example of a vicinity of a information transmission and reception region of the window glass for a vehicle according to the present embodiment.
Figure 4:
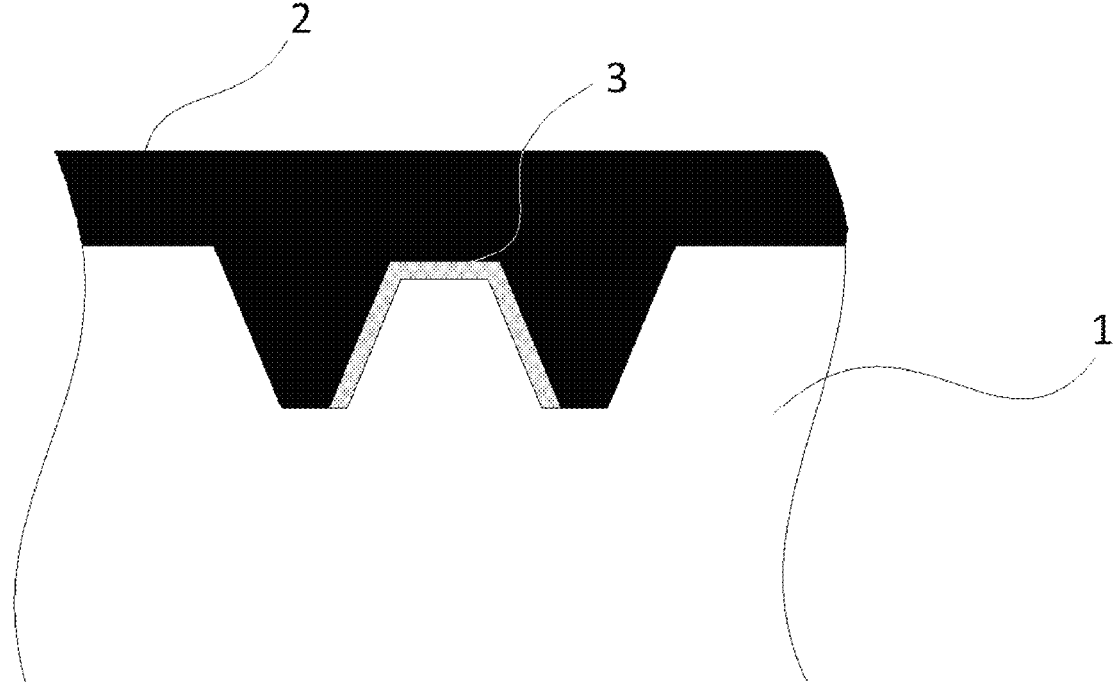
FIG. 4 is a schematic diagram showing an example of the vicinity of the information transmission and reception region of the window glass for a vehicle according to the present embodiment.

The information transmission and reception region formed by the organic ink layer may be an independent region separated by the organic ink layer 3, as shown in FIG. 3. In addition, the information transmission and reception region may be continuous with another region on the glass plate 1 without being separated by the organic ink layer 3, as shown in FIG. 4.

The organic ink layer is formed by a polymeric resin composition containing a pigment as a coloring agent. The polymeric resin composition contains a resin, a dispersant, a solvent, or the like, as necessary, in addition to the pigment. Note that, this polymeric resin composition is referred to as an "organic ink composition" in the present description.

The pigment may be any coloring material such as an organic pigment, an organic dye, or an inorganic pigment, and can be used alone or in combination of two or more types thereof. The coloring material can be appropriately selected depending on the desired color, and for example, when light-shielding properties are required, a black coloring material or the like is preferably used.

When the organic ink layer is a black layer, the pigment is preferably at least one pigment or dye selected from the group consisting of carbon black, graphite, and a metal oxide, and more preferably carbon black.

When the organic ink layer is a black layer, the color can be represented by a brightness index $L^*$ value in a CIE 1976 $(L^*a^*b^*)$ color space (CIELAB) standardized by the International Commission on Illumination (CIE). The brightness index $L^*$ value is an index indicating a brightness of a color tone, and can be measured in accordance with JIS Z 8722 (2009). When the $L^*$ value is large, the color tone is bright, and when the brightness index $L^*$ value is small, the color tone is dark.

When the $L^*$ value of the organic ink layer is in the range of 0 to 30, the organic ink layer is black, and the object as the window glass for a vehicle is achieved. The $L^*$ value of the organic ink layer is preferably 18 to 30, more preferably 20 to 25, and still more preferably 21 to 23. Here, from the viewpoint of enhancing aesthetic satisfaction with a high quality feeling, the $L^*$ value of the organic ink layer is preferably 18 or more, more preferably 20 or more, and still more preferably 21 or more in consideration of a black color degree. On the other hand, when the $L^*$ value of the organic ink layer is more than 30, a white color degree increases. Therefore, the $L^*$ value is preferably 30 or less, more preferably 25 or less, and still more preferably 23 or less.

The resin may be a resin having any property such as a thermoplastic resin, a photocurable resin, or a thermosetting resin, and preferably a thermosetting resin or a photocurable resin.

Specific examples thereof include known resins such as a polyurethane resin, a phenol-based resin, an epoxy-based resin, a urea melamine-based resin, a silicone-based resin, a phenoxy resin, a methacrylic resin, an acrylic resin, a polyarylate resin, a polyester-based resin, a polyolefin-based resin, a polystyrene-based resin, polyvinyl chloride, a vinyl chloride-vinyl acetate copolymer, polyvinyl acetate, polyvinylidene chloride, a polycarbonate, polyethylene terephthalate, polyether sulfone, an acrylonitrile-butadiene-styrene (ABS) resin, a transparent ABS resin, celluloses, and polyacetal.

The resin may be a resin made of a homopolymer, or a resin made of a copolymer of a monomer copolymerizable with a monomer of these resins. The binder may be used alone or in combination of two or more types thereof.

It is preferable that the photocurable resin have the property of being cured by irradiation with UV light, from the viewpoint of simplifying a resin curing process and eliminating a need for a firing furnace. The photocurable resin can be obtained by adding a photopolymerization initiator to, for example, an acrylic resin among the resins shown above, and a photocured film can be obtained by irradiating this with light.

A thermal curing temperature for the thermosetting resin is preferably 100° C. to 500° C., more preferably 150° C. to 400° C., and still more preferably 200° C. to 300° C. Here, it is preferable to perform curing at a temperature lower than a firing temperature for forming the ceramic color layer, that is, at a temperature lower than an annealing point of the glass plate, from the viewpoint of maintaining a molded shape of the glass plate. Specifically, the thermal curing temperature for the resin is preferably 500° C. or lower, more preferably 400° C. or lower, and still more preferably 300° C. or lower. In addition, from the viewpoint of curing stability of the resin and adhesion to the glass plate, the thermal curing temperature for the resin is preferably 100° C. or higher, more preferably 150° C. or higher, and still more preferably 200° C. or higher.

Examples of such a thermosetting resin include an acrylic resin and a silicone-based resin among the resins shown above.

The dispersant is not particularly limited, and examples thereof include a cellulose derivative, an organic acid, and a terpene compound. Examples of the organic acid include an unsaturated carboxylic acid polymer, and other organic acids may also be used. The dispersant may be used alone or in combination of two or more types thereof.

The solvent is not particularly limited, and examples thereof include known solvents such as water, alcohols, esters, ketones, aromatic hydrocarbon-based solvents, and aliphatic hydrocarbon-based solvents.

As the alcohols, for example, isopropyl alcohol, methanol, or ethanol can be used. As the esters, for example, ethyl acetate can be used. As the ketones, for example, methyl ethyl ketone can be used. As the aromatic hydrocarbon-based solvent, for example, toluene, xylene, Solvesso (trademark) 100, and Solvesso (trademark) 150 can be used. As the aliphatic hydrocarbon-based solvent, for example, hexane can be used.

The solvent may be used alone or in combination of two or more types thereof.

(Ceramic Color Layer)

The ceramic color layer is provided in the peripheral portion of the information transmission and reception region on the first main surface of the glass plate. However, this does not in any way exclude that the ceramic color layer is provided in a region other than the peripheral portion of the information transmission and reception region. For example, the ceramic color layer may also be provided in a periphery of the window glass for a vehicle.

The ceramic color layer can be a fired layer by applying a pasty ceramic color composition, which is a precursor of the ceramic color layer, to a desired region on the first main surface of the glass plate and by baking through a heat treatment. Note that, in the present description, the ceramic color layer is a fired body of a ceramic color composition, and the ceramic color composition is an inorganic component containing a glass frit and a pigment. When the ceramic color composition is applied to the first main surface of the glass plate, a mixture with an organic component for forming a paste is referred to as a pasty ceramic color composition.

When the ceramic color composition is fired to form a ceramic color layer, the ceramic color layer is bonded to the glass plate. As a result, even when a conductive layer, a solder layer, or the like is further formed on the surface of the ceramic color layer, peeling of the ceramic color layer from the glass plate is prevented.

The thickness of the ceramic color layer is larger than that of the organic ink layer. The thickness of the ceramic color layer influences an ultraviolet transmittance, acid resistance, weather resistance, glass strength, and cost. The thickness of the ceramic color layer is preferably 6 μm to 30 μm, more preferably 6 μm to 20 μm, and still more preferably 10 μm or more and less than 15 μm.

Here, when the thickness of the ceramic color layer is too small, for example, when acid rain penetrates the ceramic color layer, the ceramic color layer is discolored or is transparent, and thereby the ceramic color layer may not serve as the original ceramic color layer. Therefore, the thickness of the ceramic color layer is preferably 6 μm or more, and more preferably 10 μm or more.

On the other hand, when the thickness of the ceramic color layer is too large, the ceramic color layer is easily influenced by a stress, which leads to an increase in cost. Therefore, the thickness of the ceramic color layer is preferably 30 μm or less, more preferably 20 μm or less, and still more preferably less than 15 μm.

Similar to the organic ink layer, the thickness of the ceramic color layer is obtained by stylus measurement using a surface roughness measuring device in accordance with JIS B 0601 (1994). The thickness of the ceramic color layer does not need to be constant, and it is preferable that, in a region away from the boundary portion between the glass plate and the ceramic color layer by 1.5 mm or more in a direction in which the ceramic color layer is formed, an average thickness of the ceramic color layer at a given width of 1.0 mm be within the above range.

Surface roughness Ra of the ceramic color layer is preferably 0.25 μm to 2.0 μm, more preferably 0.3 μm to 2.0 μm, and still more preferably 0.4 μm to 1.0 μm. Here, from the viewpoint of adhesiveness of the organic ink layer, the surface roughness Ra is preferably 0.25 μm or more, more preferably 0.3 μm or more, and still more preferably 0.4 μm or more.

The adhesiveness of the organic ink layer can be evaluated by an abrasion test. Specifically, a Taber abrasion test based on JIS R 3212:1998 is performed on a sample in which a ceramic color layer and an organic ink layer are sequentially provided on a first main surface of a glass plate. The surface on which the ceramic color layer and the organic ink layer are formed is polished with an abrasion wheel, and the adhesiveness of the organic ink layer can be evaluated based on a degree to which the organic ink layer remains on the ceramic color layer. For the Taber abrasion test, for example, a rotary abrasion tester TS-2 manufactured by Toyo Seiki Seisaku-sho, Ltd. can be used.

The upper limit of the surface roughness Ra of the ceramic color layer is not particularly limited, and is, for example, preferably 2.0 μm or less, and more preferably 1.0 μm or less, from the viewpoint of strength.

The surface roughness Ra of the ceramic color layer is obtained by stylus measurement using a surface roughness measuring device in accordance with JIS B 0601 (1994). In addition, the value of the surface roughness Ra can be adjusted based on, for example, a crystallinity X and a particle diameter of the ceramic color layer.

As the pigment in the ceramic color layer, a known pigment can be used. For example, a combination of $CuO \cdot Cr_2O_3$ (black), $CoO \cdot Cr_2O_3$ (black), $Fe_2O_3$ (brown), $TiO_2$ (white), $CoO \cdot Al_2O_3$ (blue), $NiO \cdot Cr_2O_3$ (green), and the like can be used. When such a pigment is used, a desired color, gloss, and opacity, that is, the transmittance characteristics can be imparted. Among them, from the viewpoint of providing the ceramic color layer, it is preferable that the ceramic color layer be a black ceramic layer containing a black pigment.

The pigment in the case of the black ceramic layer is preferably an oxide pigment containing at least one selected from the group consisting of Cu, Fe, Co, Ni, Cr, Si, Mn, Al, and Zn, more preferably a composite oxide pigment containing two or more of these pigments, and still more preferably at least one composite oxide pigment selected from the group consisting of $Cu(Cr, Mn)_2O_4$, $CuCrO_4$, $Cr_2O_3:Fe_2O_3$, $Cr_2O_3:Fe_2O_3:CoO$, $(Fe, Mn)(Mn, Fe)_2O_4$, $(Co, Fe)(Fe, Cr)_2O_4$, $(Co, Fe, Mn)(Fe, Cr, Mn)_2O_4$, $(Co, Fe)(Ni, Cr)_2O_4$, and $(Cu, Fe, Mn)(Fe, Mn, Al)_2O_4$.

Similar to the organic ink layer, when the brightness index L* value in the CIE 1976 (L*a*b*) color space (CIELAB) standardized by the International Commission on Illumination (CIE) is in the range of 0 to 30, the ceramic color layer is a black ceramic layer and the object as the window glass for a vehicle is achieved. The L* value of the ceramic color layer is preferably 18 to 30, more preferably 20 to 25, and still more preferably 21 to 23. Here, from the viewpoint of enhancing aesthetic satisfaction with a high quality feeling, the L* value of the ceramic color layer is preferably 18 or more, more preferably 20 or more, and still more preferably 21 or more in consideration of a black color degree. On the other hand, when the L* value is more than 30, a white color degree increases. Therefore, the L* value is preferably 30 or less, more preferably 25 or less, and still more preferably 23 or less.

It is preferable that the ceramic color composition, which is a precursor of the ceramic color layer, further contain a filler, in addition to the glass frit and the pigment.

Examples of the filler include a crystallization accelerator and what is called a low expansion filler.

The crystallization accelerator is preferably added when it is desired to increase a crystallized region on the ceramic color layer. When firing the ceramic color composition, the crystallized region is formed by a heat treatment at a temperature higher than a crystallization temperature of the glass frit. When a crystallization accelerator is contained in the ceramic color composition, the crystallization accelerator serves as a crystal nucleus, so that crystallization starts at a temperature lower than the above crystallization temperature and the crystallized region increases.

The type of the crystallization accelerator varies depending on the composition of the glass frit. For example, when the glass frit contains Bi, a bismuth silicate-based crystallization accelerator is preferred. In addition, when crystal phases have a similar pattern, the crystallization may be promoted even when the compositions are different.

It is preferable to add a low expansion filler from the viewpoint of improving the strength of the window glass for a vehicle.

For example, when a solder layer is provided on the window glass for a vehicle, a stress due to a difference in thermal expansion coefficient between the glass plate and the solder may be generated in addition to a thermal stress due to local heating of the glass plate during soldering and a residual stress after cooling, thereby decreasing the strength of the window glass for a vehicle. In contrast, when a low expansion filler is contained in the ceramic color layer interposed between the glass plate and the solder layer, expansion of the ceramic color layer due to local heating of the glass plate during soldering can be prevented. Accordingly, the stress due to the difference in thermal expansion coefficient between the glass plate and the solder can be reduced, and a decrease in strength of the window glass for a vehicle can be prevented.

As the low expansion filler, a known low expansion filler can be used. Examples of the low expansion filler include cordierite, zircon, alumina, titania, zirconium phosphate, silica, and forsterite. One of these may be used, or two or more types thereof may be used in combination. Among them, it is more preferable to contain at least one selected from the group consisting of cordierite, zircon, and silica.

The ceramic color layer may further contain an oxidizing agent as long as the effect of the present invention is not impaired. As the oxidizing agent, a known oxidizing agent can be used, and examples thereof include $CeO_2$ and $MnO_2$.

The thermal expansion coefficient of the ceramic color layer is preferably close to the thermal expansion coefficient of the glass plate from the viewpoint of obtaining high strength as a window glass for a vehicle. When the thermal expansion coefficient of the ceramic color layer is brought close to the thermal expansion coefficient of the glass plate, even in the case where a residual stress is generated on the glass plate when providing a lead-free solder layer on a conductive film containing silver that is separately printed on the window glass for a vehicle, expansion of the ceramic color layer can be prevented, and a decrease in strength of the window glass for a vehicle can be prevented. In addition, when the thermal expansion coefficients of the ceramic color layer and the glass plate are brought close to each other, in forming the ceramic color layer at a temperature equal to or higher than an annealing point of the glass, it is possible to prevent the occurrence of the distortion in the glass plate at the boundary between the region where the ceramic color layer is formed and the region where the ceramic color layer is not formed. This distortion in the glass plate is caused by preventing the occurrence of the uneven shape on the glass plate at the boundary between the region where the ceramic color layer is formed and the region where the ceramic color layer is not formed, due to the difference in thermal expansion coefficient between the ceramic color layer and the glass plate.

The thermal expansion coefficient of the ceramic color layer is preferably equal to or smaller than the thermal expansion coefficient of the glass plate. For example, when a soda lime glass is used as the glass plate, the thermal expansion coefficient thereof is $85 \times 10^{-7}/°$ C. to $90 \times 10^{-7}/°$ C. Therefore, the thermal expansion coefficient of the ceramic color layer at 50° C. to 350° C. is, for example, preferably $40 \times 10^{-7}/°$ C. to $85 \times 10^{-7}/°$ C., more preferably $50 \times 10^{-7}/°$ C. to $80 \times 10^{-7}/°$ C., and still more preferably $60 \times 10^{-7}/°$ C. to $77 \times 10^{-7}/°$ C. Here, the thermal expansion coefficient of the ceramic color layer at 50° C. to 350° C. is preferably $40 \times 10^{-7}/°$ C. or more, more preferably $50 \times 10^{-7}/°$ C. or more, still more preferably $60\times10^{-7}$/° C. or more, and is preferably $85\times10^{-7}$/° C. or less, more preferably $80\times10^{-7}$/° C. or less, still more preferably $77\times10^{-7}$/° C. or less. Note that, since it is difficult to directly measure the thermal expansion coefficient of the ceramic color layer, the thermal expansion coefficient is a value measured using a differential thermal dilatometer based on an average value of percentages of elongation per 1° C. at the time of heating the ceramic color composition in the range of 50° C. to 350° C.

The distortion that occurs in the glass plate when there is a difference in thermal expansion coefficient between the ceramic color layer and the glass plate can be confirmed visually. Alternatively, it can be measured quantitatively using polarized light, and based on this measurement, the residual stress applied to the glass plate can be calculated. Specifically, a magnitude of birefringence is measured, and the residual stress is calculated using a separately obtained photoelastic constant of the glass plate. A device for measuring the birefringence is commercially available from Luceo Co., Ltd, Orihara industrial co., ltd, HINDS Instruments in U.S.A., or the like, and a crossed Nicols method, a circular polarization method, a sensitive tint method, a Senarmont method, a rotating analyzer method, or the like is adopted. However, these devices can only measure the stress in a transparent glass plate portion, and cannot measure the stress in the ceramic color layer. Therefore, it is necessary to consider by estimating that a stress balanced with the stress of the glass plate remains for the ceramic color layer.

(Glass Plate)

The glass plate has a first main surface and a second main surface, and has a curved surface shape in which the first main surface is concave. An information communication device is disposed on a first main surface side, and the glass plate has an information transmission and reception region through which a signal transmitted and received by the information communication device passes through.

When the ceramic color layer is provided in a peripheral portion of the information transmission and reception region on the first main surface of the glass plate, and the organic ink layer is provided to cover at least a partial region on the ceramic color layer and a partial region on the first main surface of the glass plate, a range of the information transmission and reception region is determined.

It is preferable that the glass plate be disposed in a vehicle such that the first main surface is on a vehicle inner side and the second main surface is on a vehicle outer side. Accordingly, at least a part of light in the infrared region in the sunlight entering the vehicle from outside the vehicle is absorbed by the ceramic color layer, and it is possible to prevent deterioration due to discoloration of the organic ink layer located at the vehicle inner side with respect to the ceramic color layer.

As the glass plate, a known glass plate used for the window glass for a vehicle in the related art can be used. Examples thereof include a soda lime glass, an aluminosilicate glass, a borosilicate glass, an alkali-free glass, and a quartz glass.

As the glass plate, a glass plate subjected to a strengthening treatment as necessary can be used. Particularly, when the window glass for a vehicle is a window glass for an automobile and is used as a side glass or a rear glass, a strengthening treatment may be performed according to a required safety standard.

The strengthening treatment may be a chemical strengthening treatment or a physical strengthening treatment (air cooling strengthening treatment), and the physical strengthening treatment is preferred from the viewpoint of a strengthening treatment time and cost.

The physical strengthening treatment is a treatment method that strengthens the surface of the glass plate by generating a compressive stress layer on the surface of the glass plate due to a temperature difference between the surface and the inside of the glass plate. Specifically, the compressive stress layer due to a temperature difference is generated by an operation other than annealing, such as rapid cooling by spraying a cooling medium onto the glass plate heated to be equal to or higher than the annealing point of the glass, for example, 500° C. to 600° C. or higher.

The chemical strengthening treatment is a treatment in which the glass plate is brought into contact with a metal salt by a method such as immersion of the glass plate in a molten solution of a metal salt containing metal ions having a large ion radius, and metal ions having a small ion radius in the glass are substituted with the metal ions having a large ion radius. Typically, lithium ions are substituted with sodium ions or potassium ions, and sodium ions are substituted with potassium ions.

When the chemical strengthening treatment is performed, a known molten solution of a metal salt, that is, a molten salt can be used. Conditions in the chemical strengthening treatment are appropriately selected in consideration of the glass composition, the type of the molten salt, and the like. In addition, the chemical strengthening treatment may be performed in multiple stages, or cleaning with an alkaline solution, cleaning by plasma irradiation, or the like may be performed.

A thickness of the glass plate may be set according to the purpose, and is not particularly limited.

For example, in the case of being used for a window glass for an automobile among vehicles, the thickness of the glass plate is approximately 0.2 mm to 5.0 mm, and preferably 0.3 mm to 3.0 mm. Here, the thickness of the glass plate is approximately 0.2 mm or more, preferably 0.3 mm or more, and is approximately 5.0 mm or less, preferably 3.0 mm or less.

In the case of being used for a window glass for an automobile, particularly for a laminated glass and then for a windshield, the window glass for a vehicle according to the present embodiment may be used so as to be located on the vehicle outer side, or may be used so as to be located on the vehicle inner side, or may be used for both.

In the case of being used as a laminated glass for a windshield and located on the vehicle outer side, the thickness of the glass plate is more preferably 1.1 mm to 3.0 mm, and still more preferably 1.5 mm to 2.8 mm. Here, from the viewpoint of strength such as flying stone resistance, the thickness of the glass plate is more preferably 1.1 mm or more, and still more preferably 1.5 mm or more. In addition, from the viewpoint of weight reduction of the laminated glass, the thickness of the glass plate is preferably 3.0 mm or less, and more preferably 2.8 mm or less.

In the case of being used as a laminated glass for a windshield and located on the vehicle inner side, the thickness of the glass plate is more preferably 0.3 mm to 2.3 mm. Here, the thickness of the glass plate is preferably 0.3 mm or more from the viewpoint of handling properties, and more preferably 2.3 mm or less from the viewpoint of weight reduction.

Note that, it is preferable that both the glass plate located on the vehicle outer side and the glass plate located on the vehicle inner side in the case of being used as a laminated glass for a windshield be an un-strengthened glass that has not been subjected to a strengthening treatment, from the viewpoint of preventing cracks from spreading across the entire surface in the event of damage.

(Window Glass for a Vehicle)

The window glass for a vehicle according to the present embodiment may be formed with a conductive layer or a solder layer in addition to the ceramic color layer and the organic ink layer. Further, a low reflection film layer, a heat insulating film layer, a UV (ultraviolet light) cutting film layer, or the like may be provided as long as the effect of the present invention is not impaired. For these, known ones can be used.

The window glass for a vehicle according to the present embodiment may be a laminated glass for a vehicle bonded to one or more other glass plates via an interlayer. The one or more other glass plates may be the same as or different from the glass plate in the present embodiment.

By making the window glass for a vehicle into the laminated glass for a vehicle, it is suitably used mainly for a windshield for an automobile and a roof glass for an automobile.

It is sufficient that at least one of the glass plates used in the laminated glass for a vehicle is the window glass for a vehicle according to the present embodiment provided with a ceramic color layer and an organic ink layer, and other glass plates may be different from the window glass for a vehicle according to the present embodiment.

The number of glass plates constituting the laminated glass for a vehicle may be two or more, and from the viewpoint of weight reduction, two is more preferred.

The thicknesses of the two or more glass plates used in the laminated glass for a vehicle may be the same as or different from each other.

The window glass for a vehicle according to the present embodiment is particularly preferably used as a windshield for a vehicle, and more preferably used as a windshield for an automobile. In addition, it is also preferable to use the window glass for a vehicle as a windshield for a vehicle, and more preferably to use the window glass for a vehicle as a windshield for an automobile, while being used as the above laminated glass for a vehicle.

A material for the interlayer used in the laminated glass for a vehicle is not particularly limited, and for example, a thermoplastic resin is preferred.

Examples of the thermoplastic resin include a plasticized polyvinyl acetal-based resin, a plasticized polyvinyl chloride-based resin, a saturated polyester-based resin, a plasticized saturated polyester-based resin, a polyurethane-based resin, a plasticized polyurethane-based resin, an ethylene-vinyl acetate-based copolymer resin, an ethylene-ethyl acrylate-based copolymer resin, a cycloolefin polymer resin, and an ionomer resin. In addition, a resin composition containing a modified block copolymer hydride described in JP6065221B can also be suitably used.

The thermoplastic resins may be used alone or in combination of two or more types thereof. In addition, the expression "plasticized" means that plasticization is performed by addition of a plasticizer. In addition, the material for the interlayer may be a resin containing no plasticizer, such as an ethylene-vinyl acetate copolymer-based resin.

Among them, a plasticized polyvinyl acetal-based resin is more preferred since it is excellent in balance among various performances such as transparency, weather resistance, strength, adhesive force, penetration resistance, impact energy absorbability, moisture resistance, heat shielding properties, and sound insulating properties.

Examples of the polyvinyl acetal-based resin include a polyvinyl formal resin obtained by reacting polyvinyl alcohol (PVA) with formaldehyde, a polyvinyl acetal-based resin in a narrow sense obtained by reacting PVA with acetaldehyde, and a polyvinyl butyral resin (PVB) obtained by reacting PVA with n-butyraldehyde. Particularly, PVB is more preferred since it is excellent in balance among various performances such as transparency, weather resistance, strength, adhesive force, penetration resistance, impact energy absorbability, moisture resistance, heat shielding properties, and sound insulating properties. Note that, these polyvinyl acetal-based resins may be used alone or in combination of two or more types thereof.

<Method for Manufacturing Window Glass for a Vehicle>

A method for manufacturing a window glass for a vehicle according to the present embodiment sequentially includes the following step a to step c.

(Step a) a step of preparing a glass plate having a first main surface and a second main surface;

(Step b) a step of applying a pasty ceramic color composition to a peripheral portion of an information transmission and reception region, through which a signal transmitted and received by an information communication device disposed on a first main surface side passes, on the first main surface of the glass plate, and performing a heat treatment at a firing temperature equal to or higher than an annealing point of the glass plate to bend and mold the glass plate such that the first main surface is concave and form a ceramic color layer; and (Step c) a step of applying an organic ink composition to cover a partial region on the first main surface of the glass plate and at least a partial region on the ceramic color layer, as well as a boundary portion between the glass plate and the ceramic color layer, and curing the organic ink composition to form an organic ink layer.

In the step c, the organic ink composition is applied such that a thickness of the organic ink layer is smaller than a thickness of the ceramic color layer.

(Step a)

As the glass plate having a first main surface and a second main surface, those described in (Glass Plate) in the above <Window Glass For a Vehicle> can be preferably used. The glass plate can be manufactured, or a commercially available glass plate may be used.

A size of the glass plate may be appropriately determined according to the application. For example, when the window glass for a vehicle is a windshield for an automobile, a glass plate of 500 mm to 1,300 mm×1,200 mm to 1,700 mm×1.6 mm to 2.5 mm is prepared.

Generally, one glass plate is used, and in the case of a laminated glass for a vehicle, two or more glass plates may be bonded together to form a laminated glass and then subjected to the subsequent step b. In addition, after manufacturing a window glass for a vehicle using one glass plate, one or more other glass plates may be bonded together to form a laminated glass.

(Step b)

A pasty ceramic color composition is applied to a peripheral portion of an information transmission and reception region, through which a signal transmitted and received by an information communication device disposed on a first main surface side passes, on the first main surface of the glass plate prepared in the step a.

The pasty ceramic color composition is a pasty ceramic color composition containing a glass frit, a pigment, and further various fillers as necessary, and is a precursor of the ceramic color layer. The ceramic color layer is formed by subjecting this ceramic color composition to a heat treatment at a firing temperature equal to or higher than the annealing point of the glass plate.

As each component such as the glass frit and the pigment in the ceramic color composition, those described in (Ceramic Color Layer) in the above <Window Glass For a Vehicle> can be preferably used.

In order to obtain various characteristics of the glass frit in the ceramic color composition, one type of the glass frit may be used, or two or more types of glass frits may be used in combination. Further, two or more types of the glass frits having the same composition and different particle diameters may be appropriately mixed and used.

A softening point Ts of the glass frit in the ceramic color composition is also related to the temperature when the glass plate is subjected to firing and bending. The softening point Ts of the glass frit is preferably 500° C. to 580° C., and more preferably 520° C. to 540° C. Here, from the viewpoint of a good baking, the softening point Ts of the glass frit is preferably 500° C. or higher, and more preferably 520° C. or higher. On the other hand, in the case of further forming a conductive layer or the like on the window glass for a vehicle, the softening point Ts of the glass frit is preferably 580° C. or lower, and more preferably 540° C. or lower.

When two or more types of the glass frits are used in combination, it is more preferable that one or more types of the glass frits have a softening point within the above range, and it is still more preferable that all the glass frits have a softening point within the above range.

The softening point Ts of the glass frit can be controlled based on the composition of the glass frit. Note that, the softening point Ts in the present description is a temperature corresponding to a fourth inflection point in a DTA chart obtained by differential thermal analysis (DTA) of the glass frit. Note that, although it is difficult to directly measure the softening point Ts of the glass frit from the window glass for a vehicle after firing, the composition of the glass frit can be estimated based on the composition or the like of the ceramic color layer, and the softening point Ts can be estimated based on regression calculation using the composition of the glass frit.

A particle diameter $D_{50}$ of the glass frit is preferably 0.1 $\mu$m to 3.0 $\mu$m, more preferably 0.3 $\mu$m to 2.5 $\mu$m, and still more preferably 0.5 $\mu$m to 2.0 $\mu$m. Here, when the glass frit is too atomized, the specific surface area is increased, and moisture and carbon dioxide gas in the atmosphere are easily adsorbed. Then, foaming may occur during the formation of the ceramic color layer by firing, which may lead to a decrease in transmittance, strength, or the like. Therefore, the particle diameter $D_{50}$ of the glass frit is preferably 0.1 $\mu$m or more, more preferably 0.3 $\mu$m or more, and still more preferably 0.5 $\mu$m or more. In addition, in the case of forming other layers such as a conductive layer on the glass plate, the particle diameter $D_{50}$ of the glass frit is preferably 3.0 $\mu$m or less, more preferably 2.5 $\mu$m or less, and still more preferably 2.0 $\mu$m or less.

The particle diameter $D_{50}$ of the glass frit is a cumulative median diameter $D_{50}$ in the volume-based particle size distribution, and is measured by a laser diffraction scattering method.

From the viewpoint of preventing clogging in the case of forming the ceramic color composition on the surface of the glass plate by screen printing, a maximum particle diameter $D_{max}$ of the glass frit is preferably 30 $\mu$m or less, more preferably 20 $\mu$m or less, and still more preferably 15 $\mu$m or less. In addition, when the ceramic color composition is sintered, coarse particles remain without being melted, which may cause deterioration of sinterability or a decrease in strength. Therefore, the maximum particle diameter $D_{max}$ of the glass frit is even more preferably 10 $\mu$m or less.

A content of the glass frit in the ceramic color composition is preferably 60 mass % to 90 mass %, more preferably 65 mass % to 85 mass %, and still more preferably 70 mass % to 80 mass %. Here, from the viewpoint of obtaining a good sinterability, the content of the glass frit is preferably 60 mass % or more, more preferably 65 mass % or more, and still more preferably 70 mass % or more. On the other hand, from the viewpoint of preventing a decrease in strength of the window glass for a vehicle due to an excessively high thermal expansion coefficient of the ceramic color layer, the content of the glass frit is preferably 90 mass % or less, more preferably 85 mass % or less, and still more preferably 80 mass % or less.

Note that, the content in the ceramic color composition in the present description means a content in a total amount of inorganic components among components constituting the ceramic color composition, and a content of organic components is not taken into account. Therefore, the content of the glass frit in the ceramic color composition is an amount excluding contents of the filler and the pigment contained in the ceramic color composition.

A content of the pigment in the ceramic color composition is preferably 5 mass % to 30 mass %, more preferably 5 mass % to 25 mass %, still more preferably 10 mass % to 20 mass %, and particularly preferably 10 mass % to 15 mass %. Here, from the viewpoint of obtaining a desired color tone, the content of the pigment is preferably 5 mass % or more, and more preferably 10 mass % or more. In addition, from the viewpoint of not inhibiting the sinterability of the ceramic color layer, the content of the pigment is preferably 30 mass % or less, more preferably 25 mass % or less, still more preferably 20 mass % or less, and particularly preferably 15 mass % or less.

A content of the low expansion filler, among the filler, in the ceramic color composition is preferably 3 mass % to 30 mass %, more preferably 5 mass % to 25 mass %, and still more preferably 10 mass % to 20 mass %. Here, from the viewpoint of controlling the thermal expansion coefficient, a good fluidity, maintaining the strength of the glass plate, releasability, and the like, the content of the low expansion filler is preferably 3 mass % or more, more preferably 5 mass % or more, and still more preferably 10 mass % or more. In addition, from the viewpoint of not inhibiting the sinterability of the glass frit, the content of the low expansion filler is preferably 30 mass % or less, more preferably 25 mass % or less, and still more preferably 20 mass % or less.

A thermal expansion coefficient of the ceramic color composition at 50° C. to 350° C. is preferably $50 \times 10^{-7}/°$ C. to $130 \times 10^{-7}/°$ C., more preferably $55 \times 10^{-7}/°$ C. to $100 \times 10^{-7}/°$ C., still more preferably $60 \times 10^{-7}/°$ C. to $85 \times 10^{-7}/°$ C., and even more preferably $60 \times 10^{-7}/°$ C. to $77 \times 10^{-7}/°$ C. or less. Here, from the viewpoint of favorably maintaining the strength of the glass plate, the thermal expansion coefficient of the ceramic color composition at 50° C. to 350° C. is preferably $50 \times 10^{-7}/°$ C. or more, more preferably $55 \times 10^{-7}/°$ C. or more, still more preferably $60 \times 10^{-7}/°$ C. or more, and is preferably $130 \times 10^{-7}/°$ C. or less, more preferably $100 \times 10^{-7}/°$ C. or less, still more preferably $85 \times 10^{-7}/°$ C. or less, and even more preferably $77 \times 10^{-7}/°$ C. or less.

In order to sufficiently decompose an organic vehicle, an oxidizing agent may be added as the filler. However, in consideration of a decrease in the sinterability of the ceramic color layer, a content of the oxidizing agent is preferably 10 mass % or less.

The ceramic color composition is formed into a paste by dispersing the glass frit, the pigment, and the filler as necessary, in the organic vehicle at the above percentages. The organic vehicle is a vehicle containing an organic binder, and is used for forming the ceramic color composition into a paste.

The organic vehicle is obtained by dissolving a polymer compound in a solvent. As the polymer compound and the solvent, known compounds can be used. Examples of the polymer compound include ethyl cellulose, an acrylic resin, a styrene resin, a phenol resin, and a butyral resin. As the solvent, for example, α-terpineol, butyl carbitol, butyl carbitol acetate, 2,2,4-trimethyl-1,3-pentanediol monoisobutyrate, 2,2,4-trimethyl-1,3-pentanediol diisobutyrate, ethylene glycol mono-2-ethylhexyl ether, diethylene glycol mono-2-ethylhexyl ether, ethylene glycol monohexyl ether, diethylene glycol monohexyl ether, ethylene glycol monobutyl ether acetate, and diethylene glycol monobutyl ether, and diethylene glycol monobutyl ether can be used.

A concentration of the polymer compound in the organic vehicle is not particularly limited, and is generally 0.5 mass % to 15 mass %.

In the pasty ceramic color composition, a content of the organic vehicle containing the polymer compound is preferably 2 mass % to 40 mass %, more preferably 5 mass % to 30 mass %, and still more preferably 10 mass % to 25 mass %. Here, in consideration of printability during the screen printing, the content of the organic vehicle is preferably 2 mass % or more, more preferably 5 mass % or more, and still more preferably 10 mass % or more. On the other hand, in consideration of a binder removal property, the content of the organic vehicle is preferably 40 mass % or less, more preferably 30 mass % or less, and still more preferably 25 mass % or less.

The pasty ceramic color composition is applied to the peripheral portion of the information transmission and reception region on the first main surface of the glass plate.

The application method is not particularly limited, and a screen printing method, an inkjet method, an electronic printing method, or the like can be used, and the thickness is adjusted such that the ceramic color layer has a desired thickness. For example, a screen printing method using a screen of a #150 mesh to a #400 mesh is preferred.

Next, the applied ceramic color composition is dried as necessary, and a heat treatment is performed for baking onto the glass plate, thereby forming a ceramic color layer. Drying is performed, for example, at room temperature to 200° C. for 5 minutes to 10 minutes.

For the heat treatment, a heating furnace such as an IR furnace is used, for example. At this time, with a heat treatment at a firing temperature equal to or higher than the annealing point of the glass plate, the glass plate can be bent and molded at the same time. Accordingly, the ceramic color layer is favorably bonded to the glass plate as a fired layer, which is also preferred in terms of cost. However, this does not exclude separately firing and bending the glass plate after forming the ceramic color layer.

In the case of performing firing and bending at the same time as the firing of the ceramic color layer, the firing temperature is preferably a temperature equal to or higher than the annealing point of the glass plate, and preferably a temperature equal to or lower than (the annealing point of the glass plate+200° C.)

Since the annealing point of a soda lime glass plate generally used in the window glass for a vehicle is 500° C. to 600° C., the firing temperature is preferably about 600° C. to 800° C.

The glass plate is bent and molded such that the first main surface is concave. Examples of a method for bending the glass plate include press bending molding in which the glass plate is heated to a temperature equal to or higher than the annealing point and then the glass plate is pressed against a mold having a desired shape to be bent, and gravity bending molding in which the glass plate is bent by its own weight.

From the viewpoint of making the surface of the ceramic color layer smooth or from the viewpoint of obtaining a desired shape, press bending molding using a press device such as a heating press device is preferred. In addition, from the viewpoint of preventing an optical distortion, press bending molding is also preferred.

In the gravity bending molding, the glass plate is bent by a self-weight bending device, and unlike the press bending molding, a mold having a desired shape is not required, which is advantageous in terms of cost.

The glass plate may have a single-bent shape that is bent and molded only in one direction, for example, only in a front-rear direction or an up-down direction of an automobile in the case of being attached to an opening of the automobile. In addition, the glass plate may have a multiple-bent shape that is bent and molded in the front-rear direction and the up-down direction. When the glass plate is bent and molded to have a predetermined curvature and is curved, a curvature radius of the glass plate is, for example, 1,000 mm to 100,000 mm.

An overall structure (composition) of the obtained ceramic color layer can be directly analyzed by X-ray fluorescence, SEM-EDX, EPMA (electron probe microanalyzer), SIMS (secondary ion mass spectrometry), X-ray photoelectron spectroscopy (XPS), or the like on the surface or the cross section. In addition, all elements can be measured by cutting only the ceramic color layer with a micromanipulator and using ICP-AES (ICP emission spectrometry) or ICP-MS (inductively coupled plasma mass spectrometry).

Crystalline pigments and fillers are determined by quantitative analysis using respective standard samples by SEM-EDX or XRD, and a residue is calculated as the amount of the glass frit. Accordingly, ratios of the glass frit, the pigment, and the filler in the ceramic color layer are obtained.

The particle diameter and the particle size distribution of the filler in the ceramic color layer is obtained from a frequency distribution graph by observing a filler component with a cross section SEM-EDX and performing image analysis on the filler composition with WinROOF manufactured by MITANI CORPORATION.

In addition, the glass composition is obtained by the above combination, and thermal properties such as an annealing point may also be calculated by regression calculation of the obtained glass composition.

(Step c)

When a heat treatment is performed at a firing temperature equal to or higher than the annealing point of the glass plate in the step b, a distortion occurs in the glass plate near the ceramic color layer due to a difference in thermal expansion coefficient between the glass plate and the ceramic color layer. Further, even when the glass plate is bent and molded after the formation of the ceramic color layer, a distortion occurs in the glass plate as well.

With respect to this, an organic ink composition is applied to cover a region on the glass plate where the distortion occurs, that is, a partial region on the first main surface of the glass plate and at least a partial region on the ceramic color layer, including a boundary portion between the glass plate and the ceramic color layer, and the organic ink composition is cured to form an organic ink layer. Accordingly, the region on the glass plate where the distortion occurs is concealed, and the signal transmitted and received by the information communication device can be transmitted without being hindered.

As each component in the organic ink composition, those described in (Organic Ink Layer) in the above <Window Glass For a Vehicle> can be preferably used.

A content of the coloring material in the organic ink composition is preferably 0.1 mass % to 20 mass %, and more preferably 1 mass % to 10 mass %. Here, from the viewpoint of obtaining the light-shielding properties, the content of the coloring material is preferably 0.1 mass % or more, and more preferably 1 mass % or more. In addition, from the viewpoint of ink aggregation, the content of the coloring material is preferably 20 mass % or less, and more preferably 10 mass % or less.

A content of the resin in the organic ink composition is preferably 1 mass % to 50 mass %, and more preferably 10 mass % to 30 mass %. Here, the content of the resin is preferably 1 mass % or more, and more preferably 10 mass % or more. In addition, the content of the resin is preferably 50 mass % or less, and more preferably 30 mass % or less.

A content of the solvent in the organic ink composition is preferably 20 mass % to 80 mass %, and more preferably 40 mass % to 60 mass %. Here, the content of the solvent is preferably 20 mass % or more, and more preferably 40 mass % or more. In addition, the content of the solvent is preferably 80 mass % or less, and more preferably 60 mass % or less.

The method of applying the organic ink composition is not particularly limited, and examples thereof include a gravure printing method, a flexographic printing method, an offset printing method, a letterpress printing method, a screen printing method, a pad printing method, a spray printing method, and an inkjet printing method. Among them, an inkjet printing method is preferred since it is printing after the glass plate is molded, can be easily applied to various shapes, and does not require a gravure. Note that, the glass plate may be preheated before applying the organic ink composition to the glass plate.

The organic ink composition is applied such that the thickness of the organic ink layer is smaller than the thickness of the ceramic color layer after curing. The application thickness of the organic ink composition varies depending on the composition such as the content of the coloring material, and is generally 1 μm to 10 μm.

Curing of the organic ink composition is preferably thermal curing or photocuring, and is determined according to the type of the resin constituting the organic ink composition.

In the case of forming the organic ink layer by thermal curing, a heat treatment temperature in the thermal curing is preferably 100° C. to 500° C., more preferably 150° C. to 400° C., and still more preferably 200° C. to 300° C. Here, it is preferable to perform curing at a temperature lower than a firing temperature for forming the ceramic color layer, that is, at a temperature lower than the firing temperature that is equal to or higher than the annealing point of the glass plate, from the viewpoint of maintaining a molded shape of the glass plate. Specifically, the heat treatment temperature in the thermal curing is preferably 500° C. or lower, more preferably 400° C. or lower, and still more preferably 300° C. or lower. In addition, from the viewpoint of curing stability of the resin and adhesion to the glass, the heat treatment temperature in the thermal curing is preferably 100° C. or higher, more preferably 150° C. or higher, and still more preferably 200° C. or higher.

In addition to the above, the window glass for a vehicle according to the present embodiment may further include a conductive layer, a solder layer, a low reflection film layer, a heat insulating film layer, a UV cutting film layer, or the like, if desired. In this case, respective known layers can be formed using known methods.

The window glass for a vehicle and the manufacturing method therefor according to the present embodiment have been described in detail above, and other aspects of the present embodiment are as follows. That is, the present invention relates to the following [1]' to [13]'.

[1]' A window glass for a vehicle including: a glass plate having a first main surface and a second main surface; a ceramic color layer; and an organic ink layer, in which the glass plate has a curved surface shape in which the first main surface is concave, and has an information transmission and reception region through which a signal transmitted and received by an information communication device disposed on a first main surface side passes, the ceramic color layer is provided in a peripheral portion of the information transmission and reception region on the first main surface of the glass plate, the organic ink layer is provided to cover a partial region on the first main surface of the glass plate and at least a partial region on the ceramic color layer, as well as a boundary portion between the glass plate and the ceramic color layer on the first main surface of the glass plate, and a thickness of the organic ink layer is smaller than a thickness of the ceramic color layer.

[2]' The window glass for a vehicle according to the above [1]', in which the ceramic color layer has a surface roughness Ra of 0.25 μm or more.

[3]' The window glass for a vehicle according to the above [1]' or [2]', in which the thickness of the ceramic color layer is 6 μm to 30 μm, and the thickness of the organic ink layer is 1 μm to 10 μm.

[4]' The window glass for a vehicle according to any one of the above [1]' to [3]', in which the information transmission and reception region on the first main surface of the glass plate is an independent region separated by the organic ink layer.

[5]' The window glass for a vehicle according to any one of the above [1]' to [3]', in which the information transmission and reception region on the first main surface of the glass plate is continuous with another region on the glass plate without being separated by the organic ink layer.

[6]' The window glass for a vehicle according to any one of the above [1]' to [5]', in which the window glass is configured to be disposed in a vehicle such that the first main surface of the glass plate is on a vehicle inner side and the second main surface of the glass plate is on a vehicle outer side.

[7]' A laminated glass for a vehicle including: the window glass for a vehicle according to any one of the above [1]' to [6]'.

[8]' A windshield for a vehicle including: the window glass for a vehicle according to any one of the above [1]' to [6]', or the laminated glass for a vehicle according to the above [7]'

[9]' A method for manufacturing a window glass for a vehicle, sequentially including: preparing a glass plate having a first main surface and a second main surface; applying a pasty ceramic color composition to a peripheral portion of an information transmission and reception region, through which a signal transmitted and received by an information communication device disposed on a first main surface side passes, on the first main surface of the glass plate, and performing a heat treatment at a firing temperature equal to or higher than an annealing point of the glass plate to bend and mold the glass plate such that the first main surface is concave and form a ceramic color layer; and applying an organic ink composition to cover a partial region on the first main surface of the glass plate and at least a partial region on the ceramic color layer, as well as a boundary portion between the glass plate and the ceramic color layer, and curing the organic ink composition to form an organic ink layer, in which the organic ink composition is applied such that a thickness of the organic ink layer is smaller than a thickness of the ceramic color layer.

[10]' The method for manufacturing a window glass for a vehicle according to the above [9]', in which the organic ink composition is applied by an inkjet printing.

[11]' The method for manufacturing a window glass for a vehicle according to the above [9]' or [10]', in which the annealing point of the glass plate is 500° C. to 600° C.

[12]' The method for manufacturing a window glass for a vehicle according to any one of the above [9]' to [11]', in which the organic ink layer is formed by thermal curing or photocuring of the organic ink composition.

[13]' The method for manufacturing a window glass for a vehicle according to any one of the above [9]' to [12]', in which the organic ink layer is formed by thermal curing of the organic ink composition, and the thermal curing is performed at a heat treatment temperature lower than the firing temperature equal to or higher than the annealing point of the glass plate.

EXAMPLES

Hereinafter, the present invention will be specifically described with reference to test examples, but the present invention is not limited thereto. Examples 1 to 9 are reference inventive examples, and Example 10 is a reference comparative example. Note that, none of the glass plates in these test examples have a curved surface shape and are each a flat plate of 300 mm×300 mm×2 mm. However, it can be assumed that the test is carried out by cutting out the ceramic color layer and the organic ink layer, and a region where the ceramic color layer is formed, including a part of the information transmission and reception region, from the glass plate that constitutes the window glass for a vehicle. Therefore, it may be considered that the same results as inventive examples and comparative examples can be obtained in the case where a glass plate having a curved surface shape and a certain size is used as a window glass for a vehicle.

Example 1

One main surface of a soda lime silica glass plate of 300 mm×300 mm×2 mm was defined as a first main surface, and screen printing was performed using a pasty ceramic color composition A (for laminated glass (gravity bending molding), manufactured by Ferro Japan Co., Ltd) in the form of a hollow frame surrounded by an outer frame of 90 mm×90 mm and an inner frame of 40 mm×40 mm on a central portion of the first main surface, followed by drying at 120° C. Thereafter, the glass plate formed with a layer of the ceramic color composition was subjected to a heat treatment at 630° C. for 6 minutes and 40 seconds, and cooled to ordinary temperature to form a black ceramic color layer A as a fired layer. Thereafter, a soda lime silica glass plate 1' of 300 mm×300 mm×2 mm was stacked on a second main surface side of the glass plate formed with the ceramic color layer A, with an interlayer 4 interposed therebetween, followed by vacuum packaging and then heating at 120° C. for 30 minutes. Thereafter, autoclaving was performed to obtain a laminated glass formed with the ceramic color layer A.

Figure 5:
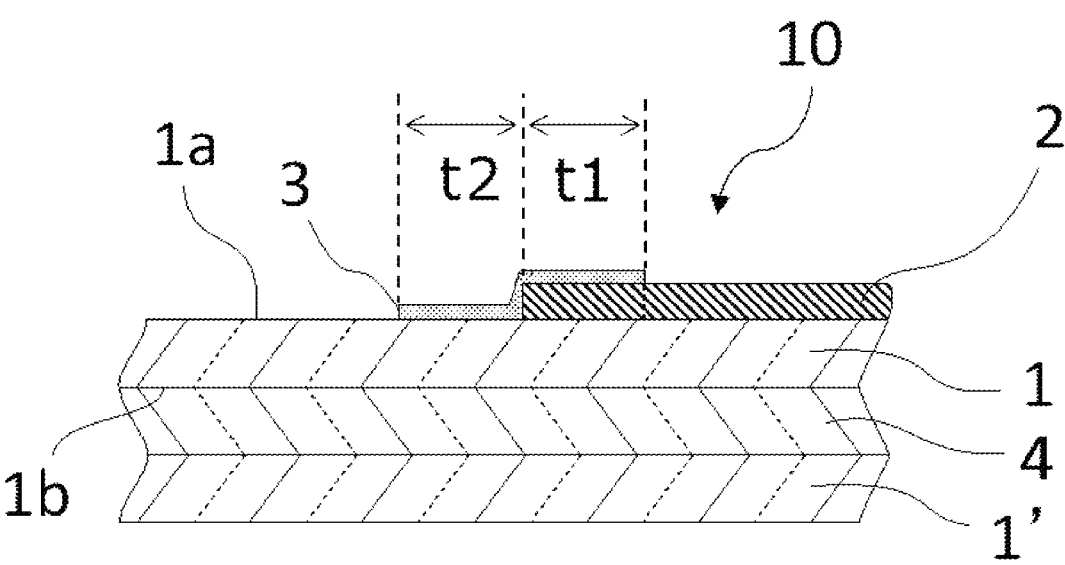
FIG. 5 is a schematic cross-sectional view showing a width of an organic ink layer overlapping a ceramic color layer and a width of the organic ink layer formed directly on a first main surface of a glass plate in Examples and Test Examples.

Next, as shown in FIG. 5, an inkjet printing was performed using an organic ink composition so as to cover the ceramic color layer A indicated by reference numeral 2 at a width t1 of 5 mm along one side of the outer frame of the ceramic color layer A, and to directly cover the first main surface of the glass plate indicated by reference numeral 1 at a width t2 of 5 mm, followed by drying at 130° C. for 10 minutes. Thereafter, the glass plate formed with a layer of the organic ink composition was subjected to a heat treatment at 200° C. for 60 minutes to thermally cure the organic ink composition, and then cooled to ordinary temperature to form an organic ink layer. Accordingly, a small piece of the window glass 10 for a vehicle, as a laminated glass, in which the ceramic color layer A and the organic ink layer were formed on or above the first main surface of the glass plate was obtained.

The annealing point of the soda lime silica glass plate used is 550° C.

Table 1 shows the contents of the pigment, the glass frit, and the organic component in the pasty ceramic color composition A. Table 1 also shows the total content of Bi and Si, which are main components, among the contents of the glass frit. The total content of Bi and Si, which are main components, is the content in the pasty ceramic color composition.

As the organic ink composition, Photoblack (registered trademark) manufactured by TORAY INDUSTRIES, INC. was used.

Example 2 and Example 3

A small piece of a window glass for a vehicle, as a laminated glass, in which the ceramic color layer A and the organic ink layer were formed on or above the first main surface of the glass plate in each of Example 2 and Example 3 was obtained in the same manner as in Example 1, except that instead of the pasty ceramic color composition A, a pasty ceramic color composition B (for laminated glass (gravity bending molding), manufactured by AGC Electronics Co., Ltd.) or a pasty ceramic color composition C (for laminated glass (press bending molding), manufactured by AGC Electronics Co., Ltd.) listed in Table 1 was used to form a ceramic color layer B or a ceramic color layer C, the thickness thereof was changed to the thickness listed in Table 2, and the thickness of the organic ink layer was also changed to the thickness listed in Table 2.

Example 4 to Example 9

A small piece of a window glass for a vehicle, as a laminated glass, in which the ceramic color layer A and the organic ink layer were formed on or above the first main surface of the glass plate in each of Example 4 to Example 9 was obtained in the same manner as in Example 1, except that the pasty ceramic color compositions A to C listed in Table 1 were used, the width t2 for directly covering the first main surface of the glass plate indicated by reference numeral 1 in FIG. 5 was 10 mm, and the thickness of the ceramic color layer and the thickness of the organic ink layer were changed to the thickness listed in Table 2.

TABLE 1

| (mass %) | | | |
| --- | --- | --- | --- |
| Pasty ceramic color composition | A | B | C |
| Pigment | 22 | 15 | 15 |
| Glass frit | 58 | 62 | 62 |
| (Main components (Bi + Si)) | (35) | (29) | (41) |
| Organic component | 20 | 23 | 23 |

TABLE 2

| | Ex. 1 | Ex. 2 | Ex. 3 | Ex. 4 | Ex. 5 | Ex. 6 | Ex. 7 | Ex. 8 | Ex. 9 | Ex. 10 |
| --- | --- | --- | --- | --- | --- | --- | --- | --- | --- | --- |
| Ceramic color layer | A | B | C | A | B | C | C | C | C | C |
| Width t1 (mm) (ceramic color layer + organic ink layer) | 5 | 5 | 5 | 5 | 5 | 5 | 5 | 5 | 5 | 5 |
| Width t2 (mm) (organic ink layer) | 4 | 4 | 4 | 10 | 10 | 10 | 10 | 10 | 10 | 10 |
| Thickness (μm) of ceramic color layer | 12.52 | 15.16 | 12.18 | 12.52 | 15.16 | 12.18 | 12.18 | 12.18 | 10.6 | 10.24 |
| Thickness (μm) of organic ink layer | 5.07 | 5.9 | 4.01 | 3.27 | 4.15 | 1.24 | 2.99 | 11.57 | 10.22 | 14.57 |
| Surface roughness Ra (μm) of ceramic color layer | 0.57 | 0.74 | 0.9 | 0.57 | 0.74 | 0.9 | 0.9 | 0.9 | 0.99 | 0.87 |
| Distortion visibility | A | A | A | A | A | A | A | A | A | A |
| Boundary visibility | A | A | A | A | A | A | A | A | B | C |

(Evaluation: Thickness)

The obtained small piece of the window glass for a vehicle was subjected to stylus measurement using a surface roughness measuring device (ACCRETECH, SURFCOM NEX 001 DX-12, manufactured by TOKYO SEIMITSU CO., LTD) in accordance with JIS B 0601 (1994), and cross-sectional shapes of the ceramic color layer and the organic ink layer were observed. Table 2 shows the measured thicknesses of the ceramic color layer and the organic ink layer, and the surface roughness Ra of the ceramic color layer. Note that, the thickness of the organic ink layer is the thickness at a position 2 mm away from the boundary portion between the glass plate and the ceramic color layer in the direction in which only the organic ink layer is formed.

(Evaluation: Distortion Visibility)

The obtained small piece of the window glass for a vehicle was evaluated for distortion visibility.

Specifically, first, the obtained small piece of the window glass for a vehicle was installed at an angle of 50° with respect to a main surface of a screen such that the second main surface side of the glass plate faced the screen. Then, a light with an incident angle of 0° perpendicular to the screen, that is, a light with an incident angle of 50° to the small piece of the window glass for a vehicle was emitted from the first main surface side of the glass plate. An image projected onto the screen through the small piece of the window glass for a vehicle becomes partially black due to the ceramic color layer or the organic ink layer. The presence or absence of the distortion in the glass was determined by visually observing the black image near the ceramic color layer or the organic ink layer. That is, when the periphery of the black region due to the ceramic color layer or the organic ink layer was glowing white, the visual field appeared distorted, and it was determined that the distortion occurred in the glass plate. In addition, when the light on the periphery of the black region was weak and did not glow white, it was determined that there was no distortion of the visual field and that the distortion of the glass plate was weak or there was no distortion. The results are shown in "Distortion visibility" in Table 2. In all examples, the distortion portion of the glass plate was covered due to the presence of the organic ink layer, and the visual field was good. Therefore, "A" is marked in Table 2.

(Evaluation: Boundary Visibility)

The obtained small piece of the window glass for a vehicle was evaluated for boundary visibility.

Specifically, a portion where the ceramic color layer was formed, a portion where the organic ink layer and the ceramic color layer were formed, and a portion where only the organic ink layer was formed were visually observed continuously, and distinguishability of the boundary, such as where the organic ink layer was provided, was determined. The results are shown in "Boundary visibility" in Table 2, and the evaluation criteria are as follows.

A (very good): the boundary where the organic ink layer is provided can be distinguished at a glance.

B (good): the boundary where the organic ink layer is provided can be distinguished by changing the way the light is applied.

C (poor): the boundary where the organic ink layer is provided cannot be distinguished.

In all of the small pieces of the window glasses for a vehicle in Example 1 to Example 10, the distortion portion of the glass plate was covered due to the presence of the organic ink layer formed at the boundary portion between the portion where the black ceramic color layer is formed and the portion where the black ceramic color layer is not formed, and the distortion visibility was good. Therefore, it was suggested that when this was used as a window glass for a vehicle, a signal transmitted and received by an information communication device could be transmitted without being hindered.

In addition, in the small piece of the window glass for a vehicle in Example 10, the boundary between the organic ink layer and the ceramic color layer could not be distinguished. Therefore, it is difficult to determine whether the organic ink layer is formed on a desired region. In contrast, in the small pieces of the window glasses for a vehicle in Example 1 to Example 9, since the boundary between the organic ink layer and the ceramic color layer can be distinguished, it is possible to easily confirm whether the organic ink layer is formed.

In Example 1 to Example 9, the organic ink layer was formed by one printing using the organic ink composition, and the above distortion visibility was good without the need for recoating. In this way, since it is not necessary to form a thick organic ink layer, the boundary visibility is also improved.

Although the present invention has been described in detail with reference to specific embodiments, it is apparent to those skilled in the art that various changes and modifications can be made without departing from the spirit and scope of the present invention. The present application is based on a Japanese Patent Application (No. 2021-165064) filed on Oct. 6, 2021, and the contents thereof are incorporated herein by reference.

REFERENCE SIGNS LIST

1: glass plate
1a: first main surface
1b: second main surface
2: ceramic color layer
3: organic ink layer
4: interlayer
10: window glass for vehicle

What is claimed is:
1. A window glass for a vehicle comprising:
a glass plate having a first main surface and a second main surface;
a ceramic color layer; and
an organic ink layer,
wherein the glass plate has a curved surface shape in which the first main surface is concave, and has an information transmission and reception region through which a signal transmitted and received by an information communication device disposed on a first main surface side passes,
the ceramic color layer is provided in a peripheral portion of the information transmission and reception region on the first main surface of the glass plate,
the organic ink layer is provided to cover a partial region on the first main surface of the glass plate and at least a partial region on the ceramic color layer, as well as a boundary portion between the glass plate and the ceramic color layer on the first main surface of the glass plate, and
a thickness of the organic ink layer is smaller than a thickness of the ceramic color layer.
2. The window glass for the vehicle according to claim 1, wherein the ceramic color layer has a surface roughness Ra of 0.25 μm or more.
3. The window glass for the vehicle according to claim 1, wherein the thickness of the ceramic color layer is 6 μm to 30 μm, and
the thickness of the organic ink layer is 1 μm to 10 μm.
4. The window glass for the vehicle according to claim 1, wherein the information transmission and reception region on the first main surface of the glass plate is an independent region separated by the organic ink layer.
5. The window glass for the vehicle according to claim 1, wherein the information transmission and reception region on the first main surface of the glass plate is continuous with another region on the glass plate without being separated by the organic ink layer.
6. The window glass for the vehicle according to claim 1, wherein the window glass is configured to be disposed in a vehicle such that the first main surface of the glass plate is on a vehicle inner side and the second main surface of the glass plate is on a vehicle outer side.
7. A laminated glass for the vehicle comprising:
the window glass for a vehicle according claim 1.
8. A windshield for the vehicle comprising:
the laminated glass for a vehicle according to claim 7.
9. A windshield for the vehicle comprising:
the window glass for a vehicle according claim 1.
10. A method for manufacturing a window glass for a vehicle, sequentially comprising:
preparing a glass plate having a first main surface and a second main surface;
applying a pasty ceramic color composition to a peripheral portion of an information transmission and reception region, through which a signal transmitted and received by an information communication device disposed on a first main surface side passes, on the first main surface of the glass plate, and performing a heat treatment at a firing temperature equal to or higher than an annealing point of the glass plate to bend and mold the glass plate such that the first main surface is concave and form a ceramic color layer; and
applying an organic ink composition to cover a partial region on the first main surface of the glass plate and at least a partial region on the ceramic color layer, as well as a boundary portion between the glass plate and the ceramic color layer, and curing the organic ink composition to form an organic ink layer,
wherein the organic ink composition is applied such that a thickness of the organic ink layer is smaller than a thickness of the ceramic color layer.
11. The method for manufacturing the window glass for the vehicle according to claim 10, wherein the organic ink composition is applied by an inkjet printing.
12. The method for manufacturing the window glass for the vehicle according to claim 10, wherein the annealing point of the glass plate is 500° C. to 600° C.
13. The method for manufacturing the window glass for the vehicle according to claim 10, wherein the organic ink layer is formed by thermal curing or photocuring of the organic ink composition.
14. The method for manufacturing the window glass for the vehicle according to claim 10, wherein the organic ink layer is formed by thermal curing of the organic ink composition, and
the thermal curing is performed at a heat treatment temperature lower than the firing temperature equal to or higher than the annealing point of the glass plate.

* * * * *